United States Patent [19]
Meyer et al.

[11] Patent Number: 5,987,158
[45] Date of Patent: *Nov. 16, 1999

[54] APPARATUS FOR AUTOMATED IDENTIFICATION OF THICK CELL GROUPINGS ON A BIOLOGICAL SPECIMEN

[75] Inventors: Michael G. Meyer, Seattle; Shih-Jong J. Lee, Bellevue; Paul S. Wilhelm, Kirkland, all of Wash.

[73] Assignee: NeoPath, Inc., Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/969,970

[22] Filed: Nov. 13, 1997

Related U.S. Application Data

[63] Continuation of application No. 08/309,116, Sep. 20, 1994, abandoned.

[51] Int. Cl.$^6$ ........................................ G06K 9/00
[52] U.S. Cl. ........................ 382/133; 382/160; 382/224
[58] Field of Search .................. 382/133, 128, 382/134, 159, 160, 224, 225, 283; 356/39, 335, 336; 877/11

[56] References Cited

U.S. PATENT DOCUMENTS

| | | |
|---|---|---|
| 3,824,393 | 7/1974 | Brain . |
| 4,097,845 | 6/1978 | Bacus . |
| 4,122,518 | 10/1978 | Castleman et al. . |
| 4,175,860 | 11/1979 | Bacus . |
| 4,183,013 | 1/1980 | Agrawala et al. . |
| 4,513,438 | 4/1985 | Graham et al. . |
| 4,523,278 | 6/1985 | Reinhardt et al. . |
| 4,538,299 | 8/1985 | DeForest . |
| 4,601,055 | 7/1986 | Kent ........................................ 382/303 |
| 4,709,333 | 11/1987 | Crawford . |
| 4,724,543 | 2/1988 | Klevecz et al. . |
| 4,731,860 | 3/1988 | Wahl . |
| 4,965,725 | 10/1990 | Rutenberg . |
| 4,973,111 | 11/1990 | Haacke et al. . |
| 4,975,972 | 12/1990 | Bose et al. . |
| 5,073,857 | 12/1991 | Peters et al. . |
| 5,086,476 | 2/1992 | Bacus . |
| 5,162,990 | 11/1992 | Odeyale et al. . |
| 5,218,645 | 6/1993 | Bacus . |
| 5,231,005 | 7/1993 | Russell et al. . |
| 5,253,302 | 10/1993 | Massen . |
| 5,257,182 | 10/1993 | Luck et al. . |
| 5,268,967 | 12/1993 | Jang et al. . |
| 5,281,517 | 1/1994 | Bacus et al. . |
| 5,287,272 | 2/1994 | Rutenberg et al. . |
| 5,315,700 | 5/1994 | Johnston et al. . |
| 5,361,140 | 11/1994 | Hayenga et al. . |
| 5,544,650 | 8/1996 | Boon et al. ............................. 382/133 |
| 5,671,290 | 9/1997 | Vaidyanathan ........................ 382/133 |
| 5,687,251 | 11/1997 | Erler et al. ............................. 382/133 |

OTHER PUBLICATIONS

Garcia et al., "Contextual Analysis of Cervical Smears in an Automated Prescreening System", *Proceedings of the Eleventh Annual Northeast Bioengineering Conference,* Mar. 14, 15, 1985, Worcester Polytechnic Institute, Worcester, Massachusetts, pp. 158–161.

(List continued on next page.)

*Primary Examiner*—Amelia Au
*Assistant Examiner*—Larry J. Prikockis
*Attorney, Agent, or Firm*—Hans I. Sun; Emil Moffa

[57] ABSTRACT

A thick group of cells classifier. Image data acquired from an automated microscope from a cytological specimen is processed by a computer system. The computer applies filters at different stages. Obvious artifacts are eliminated from analysis early in the processing. The first stage of processing is image segmentation where objects of interest are identified. The next stage of processing is feature calculation where properties of each segmented thick group object are calculated. The final step is object classification where every segmented thick group object is classified as being abnormal or as belonging to a cellular or non-cellular artifact.

16 Claims, 8 Drawing Sheets

OTHER PUBLICATIONS

Noguchi, Y., "A Detection System of Cancer Cell Based on Multi Spectral Images", Abstract from *The Transactions of the IECE of Japan,* vol. E64, No. 8, Aug. 1981.

Bacus, James W. and Les J. Grace, "Optical Microscope System For Standardized Cell Measurements and Analyses", *Applied Optics,* 26:16, pp. 3280–3293, Aug. 15, 1987.

Bartels, Peter H. et al., "A Self–Learning Computer Program for Cell Recognition", *ACTA Cytologica: The Journal of Clinical Cytology,* 14:8, pp. 486–494, Oct. 1970.

Joo, H. and R. M. Haralick, "A Binary Decision Tree Classifier", Machine Vision International, Ann Arbor, MI 48104, Feb. 19, 1986, pp. 1–19.

Mackin, Robert W., Badrinath Roysam, Timothy J. Holmes, James N. Turner, "Automated Three–Dimensional Image Analysis of Thick and Overlapped Clusters in Cytologic Preparations: Application to Cytologic Smears", *Analytical and Quantitative Cytology and Histology,* 15:6, Dec. 1993, pp. 405–417.

Chapter 39: "The StepDisc Procedure", *SAS/STAT User's Guide,* vol. 2, pp. 1493–1509, SAS Institute Inc.

Tanaka, Noboru et al., "Automated Cytologic Screening System (Cybest Model 4): and Integrated Image Cytometry System", *Applied Optics,* vol. 26, No. 16, pp. 3301–3307, Aug. 15, 1987. Copyright © 1987 by the Optical Society of America.

Brakenhoff, G.J. et al., "Three–Dimensional Chromatin Distribution in Neuroblastoma Nuclei Shown by Confocal Scanning Laser Microscopy", *Letters To Nature,* vol. 317, pp. 748–749, Oct. 24, 1985.

Duda, Richard O. and Peter E. Hart, "Fisher's Linear Discriminant", *Patent Classification and Scene Analysis,* Copyright ©1973, pp. 114–119.

Weber, J.E. et al., "Fuzzy Reasoning, Possibility Theory and Probability Theory in Expert Systems for Histopathology", IEEE/Ninth Annual Conference of the Engineering in Medicine and Biology Society, pp. 1560–1562, ©1987.

Wied, G.L. et al., "Expert Systems as Classifiers in the Diagnostic Cytopathology", IEEE/Ninth Annual Conference on the Engineering in Medicine and Biology Society, pp. 1915–1917, ©1987.

Wied, G.L. et al., "Expert System Design Under Uncertainty of Human Diagnosticians", IEEE/Eighth Annual Conference of the Engineering in Medicine and Biology Society, pp. 757–760, ©1986.

Wied, G.L. et al., "Ticas–Stratex, an Expert Diagnostic System For Stratified Cervical Epithelium", IEEE/Ninth Annual Conference of the Engineering in Medicine and Biology Society, pp. 1557–1559, ©1987.

Serra, J., *Image Analysis and Mathematical Morphology,* pp. 372–423, Academic Press, 1982.

Smith, Warren J., "Image Evaluation", *Modern Optical Engineering: The Design of Optical Systems,* McGraw–Hill Book Company, 1966, pp. 308–325.

Patten, Jr., Stanley, "Diagnostic Cytopathology of the Uterine Cervix", Basel, Switzerland, Publisher: S. Karger, 1969, 2nd Edition 1978, Third volume in *Monographs in Clinical Cytology,* edited by G.L. Wied, pp. 10–15.

Kurman, Robert J. et al., "Part 1: Specimen Adequacy" and "Part 2: Descriptive Diagnoses", *The Bethesda System for Reporting Cervical/Vaginal Cytologic Diagnoses,* Springer–Verlag.

Dytch, Harvey E. et al., "An Interactive Microcomputer–Based System for the Quantitative Analysis of Stratified Tissue Sections", *Analytical and Quantitative Cytology and Histology,* vol. 9, No. 1, pp. 69–78, Mar. 1987.

Enslein, Kurt and Peter W. Neurath, "Augmented Stepwise Discriminant Analysis Applied to Two Classification Problems in the Biomedical Field", *Computers and Biomedical Research,* 2, 568–581 (1969).

APPARATUS FOR AUTOMATED IDENTIFICATION OF THICK CELL GROUPINGS ON A BIOLOGICAL SPECIMEN

This application is a continuation of application Ser. No. 08/309,116, filed on Sep. 20, 1994, now abandoned.

The invention relates to an automated cytology system and, more particularly, to the automated identification of thick cell groups on a biological specimen such as a Papanicolaou prepared gynecological smear.

BACKGROUND OF THE INVENTION

One objective for Papanicolaou smear analysis is to emulate the well established human review process which follows standards recommended by The Bethesda System. A cytologist first views a slide at low magnification to identify areas of interest, then views those areas of interest at high magnification where it is possible to distinguish cells according to their structure and context.

The prior art has found it difficult to extract information from thick groups of cells, and, until the present invention, has not used information from thick groups of cells as a diagnostic tool.

It is therefore a motive of the invention to provide a method and apparatus to identify thick groups of cells on a biological specimen.

SUMMARY OF THE INVENTION

The invention provides a thick group analysis apparatus that performs multiple layers of processing. As image data is processed by the apparatus of the invention, the image data passes through various stages. Each stage applies filters that provide finer and finer detail. Each stage of processing incorporates more information into the decision process. The invention eliminates obviously undesirable artifacts early in the stages of processing. As specific objects progress through the filters, the invention makes more detailed evaluations of the object. The invention rapidly reduces the amount of data to be reviewed so that more time consuming techniques are used on a relatively small portion of the original data. Each filter is designed to retain a large percentage of the data of interest while rejecting as much as possible of the unavailing data. As more filters are passed, the likelihood increases that an area of interest contains potentially abnormal cells.

The invention, comprises a set of image processing functions and statistical decisions that are used to identify groups of cells that may indicate a cancerous or pre-cancerous condition.

The invention detects the presence of certain normal and abnormal cells that tend to cluster in thick syncitium of cells in Papanicolaou-stained cervical smears. The invention examines a slide that contains potentially abnormal thick groups of cells to help determine whether a slide needs to be reviewed by a cytopathologist or cytotechnologist. Information about potentially abnormal cell groups is used during slide classification to provide supporting evidence for an anomaly score or quality control score determination.

Thick groups of cells are identified by decision rules that are computed from thousands of objects that were gathered from numerous training Pap smears. The construction of statistical decision rules is called training. The data used in the construction of the rules is called training data. Decision rules used include simple feature threshold and feature threshold binary decision trees, linear, or Fisher's linear binary decision trees.

To identify different classes of thick groups of cells, each decision rule used numerical representations of group properties such as size, shape, texture, optical density and context as data. These group properties are called features.

Each decision rule uses the features of unknown thick groups of cells and classifies the thick groups as a normal artifact or potentially abnormal group.

Slides are first processed at low magnification to detect possible areas of interest. These areas of interest are then examined at high magnification. Images are processed to identify abnormalities and other important cell types occurring in single isolated form, lightly or non-overlapping clusters, or thick heavily overlapped syncitium. These analysis are handled by the single cell, group and thick group algorithms, respectively, of which the later is disclosed in this patent. As a cytologist compares size, shape, context, texture and density of cells against established criteria, so do the analyses of cells according to criteria established during their training.

Other objects, features and advantages of the present invention will become apparent to those skilled in the art through the description of the preferred embodiment, claims and drawings herein wherein like numerals refer to like elements.

BRIEF DESCRIPTION OF THE DRAWINGS

To illustrate this invention, a preferred embodiment will be described herein with reference to the accompanying drawings.

DETAILED DESCRIPTION OF THE PREFERRED EMBODIMENT

In a presently preferred embodiment of the invention, the system disclosed herein is used in a system for analyzing cervical pap smears, such as that shown and disclosed in U.S. Pat. No. 5,787,188, issued Jul. 28, 1998 to Nelson et al., entitled "Method for Identifying Normal Biomedical Specimens", which is a file wrapper continuation of abandoned U.S. patent application Ser. No. 07/838,064, filed Feb. 18, 1992; U.S. Pat. No. 5,528,703, issued Jun. 18, 1996 to Lee, entitled "Method For Identifying Objects Using Data Processing Techniques", which is a file wrapper continuation of abandoned U.S. patent application Ser. No. 07/838,395, filed Feb. 18, 1992; U.S. Pat. No. 5,315,700, issued May 24, 1994 to Johnston et al., entitled "Method And Apparatus For Rapidly Processing Data Sequences"; U.S. Pat. No. 5,361,140, issued Nov. 1, 1994 to Hayenga et al., entitled "Method and Apparatus for Dynamic Correction of Microscopic Image Signals"; and allowed U.S. patent application Ser. No. 08/302,355 for which the issue fee has been paid, filed September 7, 1994 entitled "Method and Apparatus for Rapid Capture of Focused Microscopic Images" to Hayenga et al., which is a continuation-in-part of abandoned U.S. patent application Ser. No. 07/838,063 filed on Feb. 18, 1992 the disclosures of which are incorporated herein, in their entirety, by the foregoing references thereto.

The present invention is also related to biological and cytological systems as described in the following patent applications which are assigned to the same assignee as the present invention, and which are all hereby incorporated by reference including pending U.S. Pat. No. 5,757,954, issued May 26, 1998, to Kuan et al. entitled, "Field Prioritization Apparatus and Method"; pending U.S. patent application Ser. No. 08/927,379, filed Sep. 12, 1997 which is a file wrapper continuation of abandoned U.S. patent application Ser. No. 08/309,061, to Wilhelm et al., entitled "Apparatus for Automated Identification of Cell Groupings on a Biological Specimen"; U.S. Pat. No. 5,787,189, issued Jul. 28, 1998 to Lee et al. entitled "Biological Analysis System Self Calibration Apparatus, which is a file wrapper continuation of abandoned U.S. patent application Ser. No. 08/309,115; U.S. Pat. No. 5,828,776, issued Oct. 27, 1998, which is a file wrapper continuation of abandoned U.S. patent application Ser. No. 08/308,992, to Lee et al. entitled "Apparatus for Identification and Integration of Multiple Cell Patterns"; U.S. Pat. No. 5,627,908, issued May 6, 1997 to Lee et al. entitled "Method for Cytological System Dynamic Normalization"; U.S. Pat. No. 5,638,459, issued Jun. 10, 1997 to Rosenlof et al. entitled "Method and Apparatus for Detecting a Microscope Slide Coverslip"; U.S. Pat. No. 5,566,249, issued Oct. 15, 1996 to Rosenlof et al. entitled "Apparatus for Detecting Bubbles in Coverslip Adhesive," pending U.S. patent application Ser. No. 08/867,017, filed Jun. 3, 1997, which is a file wrapper continuation of abandoned U.S. patent application Ser. No. 08/309,931, to Lee et al. entitled "Cytological Slide Scoring Apparatus"; U.S. Pat. No. 5,692,066, issued Nov. 25, 1997, to Lee et al. entitled "Method and Apparatus for Image Plane Modulation Pattern Recognition"; allowed U.S. patent application Ser. No. 08/309,250, to Lee et al., for which the issue fee has been paid, entitled "Apparatus for the Identification of Free-Lying Cells"; U.S. Pat. No. 5,740,269, issued Apr. 14, 1998 to Oh et al. entitled "A Method and Apparatus for Robust Biological Specimen Classification"; U.S. Pat. No. 5,715,327, issued Feb. 3, 1998, to Wilhelm et al. entitled "Method and Apparatus for Detection of Unsuitable Conditions for Automated Cytology Scoring."

It is to be understood that the various processes described herein may be implemented in software suitable for running on a digital processor. The software may be embedded, for example, in the central processor 540.

Figure 1A:
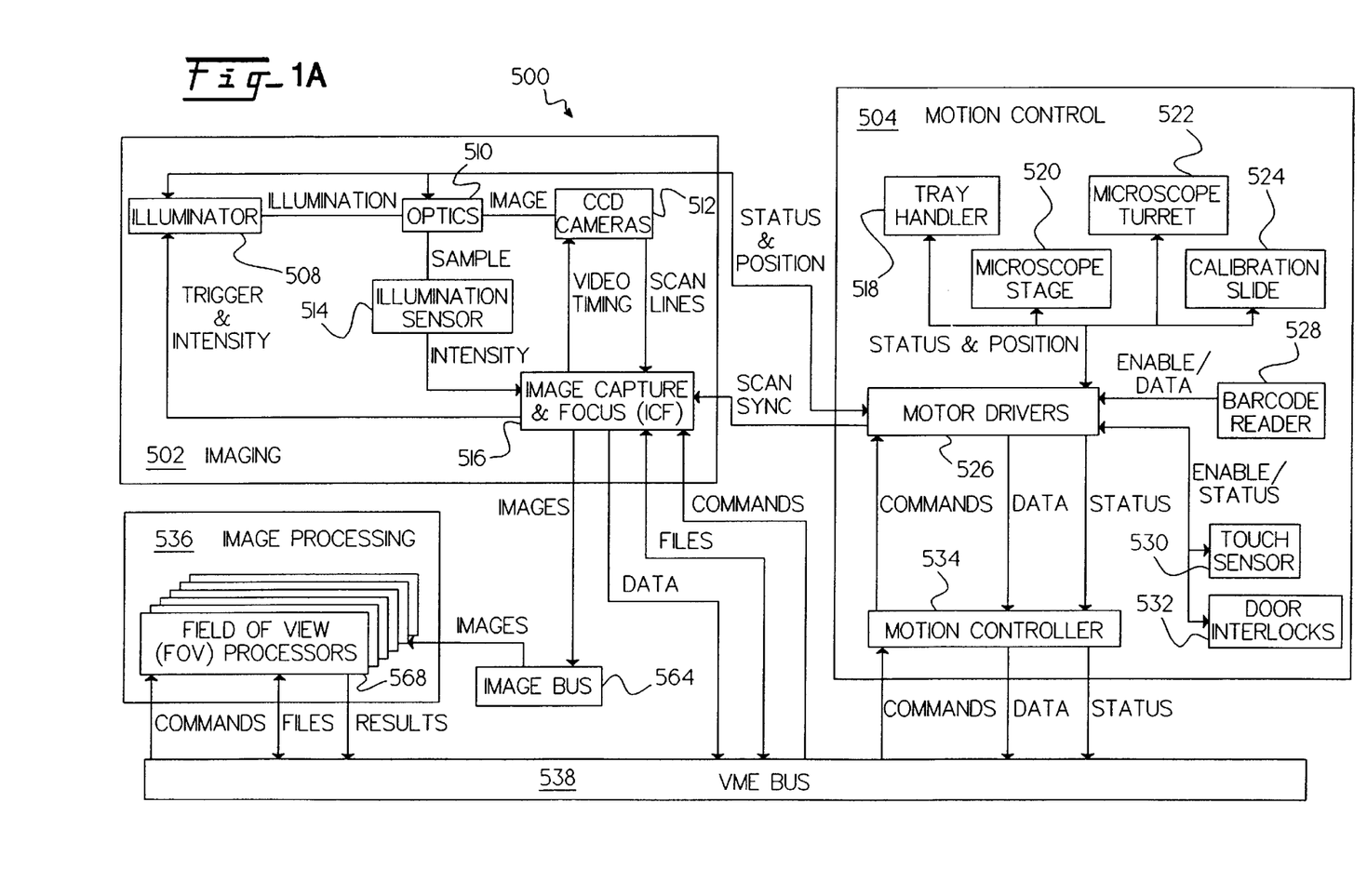
FIGS. 1A, 1B and 1C show the automated cytology screening apparatus of the invention.
Figure 1B:
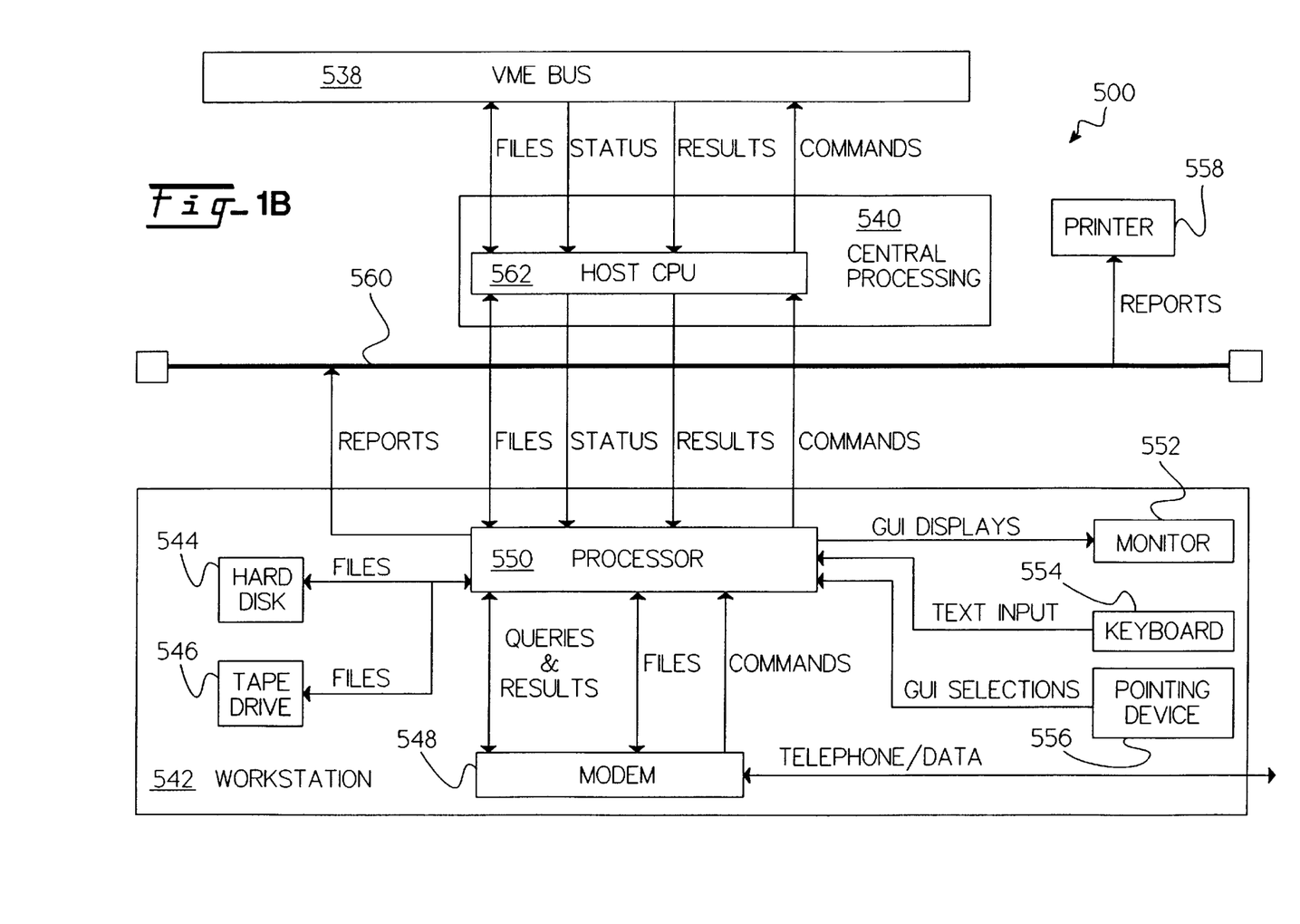
Figure 1C:
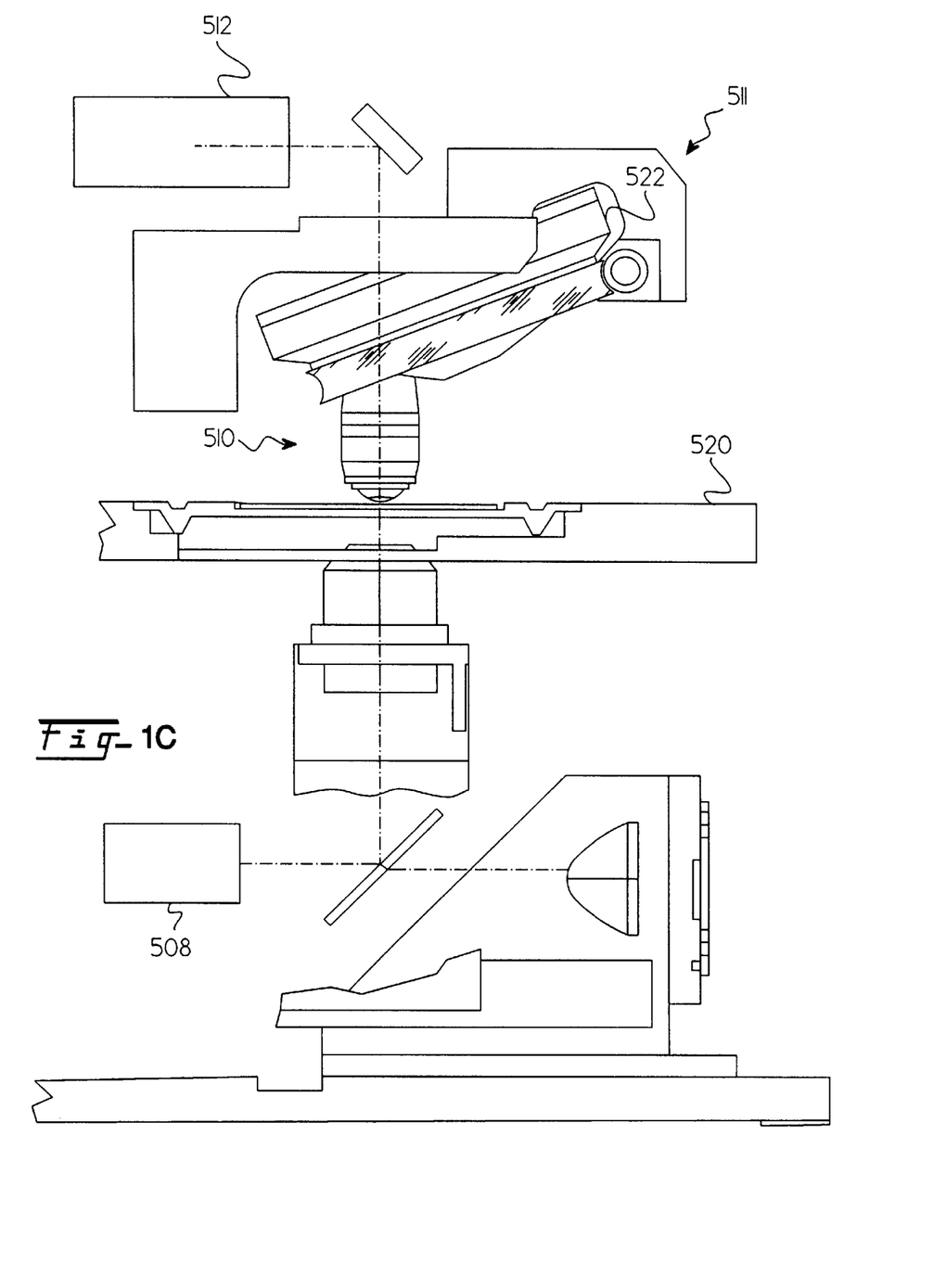

Now refer to FIGS. 1A, 1B and 1C which show a schematic diagram of one embodiment of the apparatus of the invention for field of view prioritization. The apparatus of the invention comprises an imaging system 502, a motion control system 504, an image processing system 536, a central processing system 540, and a workstation 542. The imaging system 502 is comprised of an illuminator 508, imaging optics 510, a CCD camera 512, an illumination sensor 514 and an image capture and focus system 516. The image capture and focus system 516 provides video timing data to the CCD cameras 512, the CCD cameras 512 provide images comprising scan lines to the image capture and focus system 516. An illumination sensor intensity is provided to the image capture and focus system 516 where an illumination sensor 514 receives the sample of the image from the optics 510. In one embodiment of the invention, the optics may further comprise an automated microscope 511. The illuminator 508 provides illumination of a slide. The image capture and focus system 516 provides data to a VME bus 538. The VME bus distributes the data to an image processing system 536. The image processing system 536 is comprised of field-of-view processors 568. The images are sent along the image bus 564 from the image capture and focus system 516. A central processor 540 controls the operation of the invention through the VME bus 538. In one embodiment the central processor 562 comprises a MOTOROLA 68030 CPU. The motion controller 504 is comprised of a tray handle 518, a microscope stage controller 520, a microscope turret controller 522, and a calibration slide 524. The motor drivers 526 position the slide under the optics. A bar code reader 528 reads a barcode located on the slide. A touch sensor 530 determines whether a slide is under the microscope objectives, and a door interlock 532 prevents operation in case the doors are open. Motion controller 534 controls the motor drivers 526 in response to the central processor 540. An Ethernet communication system 560 communicates to a workstation 542 to provide control of the system. A hard disk 544 is controlled by workstation processor 550. In one embodiment, workstation processor 550 may comprise a SUN SPARC CLASSIC™ workstation. A tape drive 546 is connected to the workstation processor 550 as well as a modem 548, a monitor 552, a keyboard 554, and a mouse pointing device 556. A printer 558 is connected to the ethernet 560.

During field of view prioritization, the central computer 540, running a real time operating system, controls the microscope 511 and the processor to acquire and digitize images from the microscope 511. The flatness of the slide may be checked, for example, by contacting the four corners of the slide using a computer controlled touch sensor. The computer 540 also controls the microscope 511 stage to position the specimen under the microscope objective, and from one to fifteen field of view (FOV) processors 568 which receive images under control of the computer 540.

Figure 3:
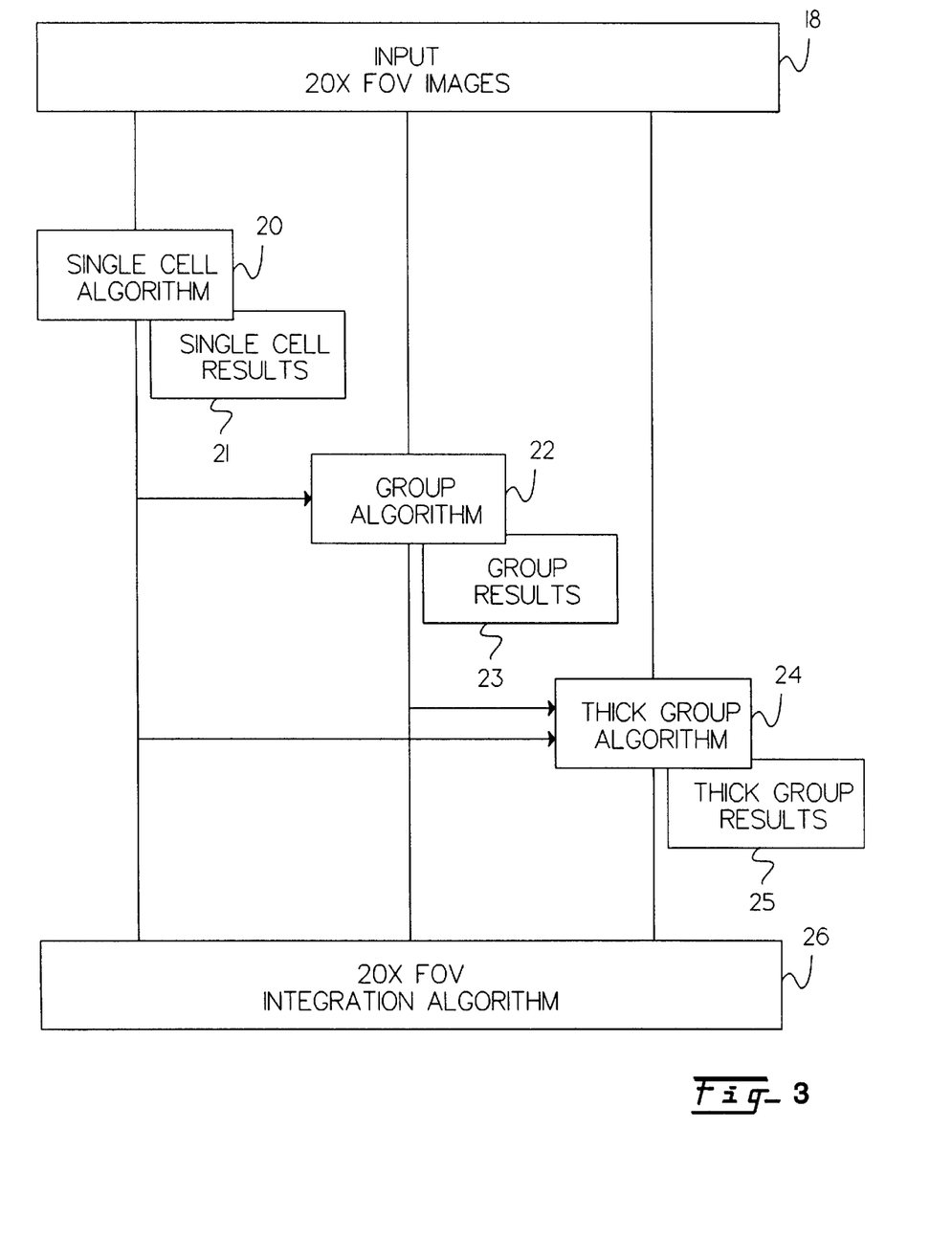
FIG. 3 shows a process flow diagram to process single cell, group, and thick group analysis.

During thick group analysis the computer system 540 receives input from three sources, as illustrated in FIG. 3.

20× FOV input images 18,

Results 21 from a single cell analysis 20,

Results 23 from a group algorithm 22, and

Results 25 from the group analysis 24.

Images at 20× magnification from the image acquisition module are processed by the computer 540. These are images the computer has analyzed at 4× magnification and have been determined to have a likelihood of containing clusters of cells. These cells may be normal or potentially abnormal cells that tend to occur in thick groups. The invention is trained to recognize grouped cells that are so densely clustered that their nuclei are difficult to differentiate. Cells that tend to occur in such thick groups include normal and abnormal cells of the endocervix and endometrium. For a complete list of the object types that were used for training, see Table 1.

The method of the invention classifies each of its segmented objects as either abnormal, which are potentially abnormal thick groups, or other, which are cellular artifacts, non-cellular artifacts or normal cell groups. Classification results from multiple analysis at 20× magnification are accumulated and used for slide classification. The thick group process also receives whole image features from both the single cell analysis and endocervical group analysis to assist thick group classification.

The following table shows objects used for training of the classifier of thick groups. Objects identified with an (A) were trained to be classified as abnormal whereas objects denoted with an (O) were classified as other objects and disregarded.

TABLE 1

| cellular objects | | artifact objects |
| --- | --- | --- |
| (O) normal endometrial | | (O) mucus |
| (A) atypical endometrial hyperplasia | | (O) bacteria |
| (A) endometrial adenocarcinoma | | (O) fibrous material |
| (O) normal endocervical | | (O) bubble edge |
| (A) AGUS | | (O) slide edge |
| (A) atypical endocervical | | (O) ground glass |
| (A) adenocarcinoma endocervical | | (O) graphite |
| (A) repair/reactive endocervical | | (O) not under coverslip |
| (O) squamous cell groups | | (O) out of focus |
| (A) herpes | | (O) other |
| (A) adenocarcinoma in situ, endocx | | (O) inside bubble |
| (A) carcinoma in situ, squamous | | |
| (O) parabasal/metaplastic | | |
| (O) cytoplasm only | (A) = abnormal | |
| (A) adenocarcinoma | (O) = Other | |
| (A) high grade SIL | | |
| (O) lymphocytes | | |
| (O) polys | | |
| (O) red blood cells | | |
| (O) histiocytes | | |
| (O) corn flaking | | |

Figure 2:
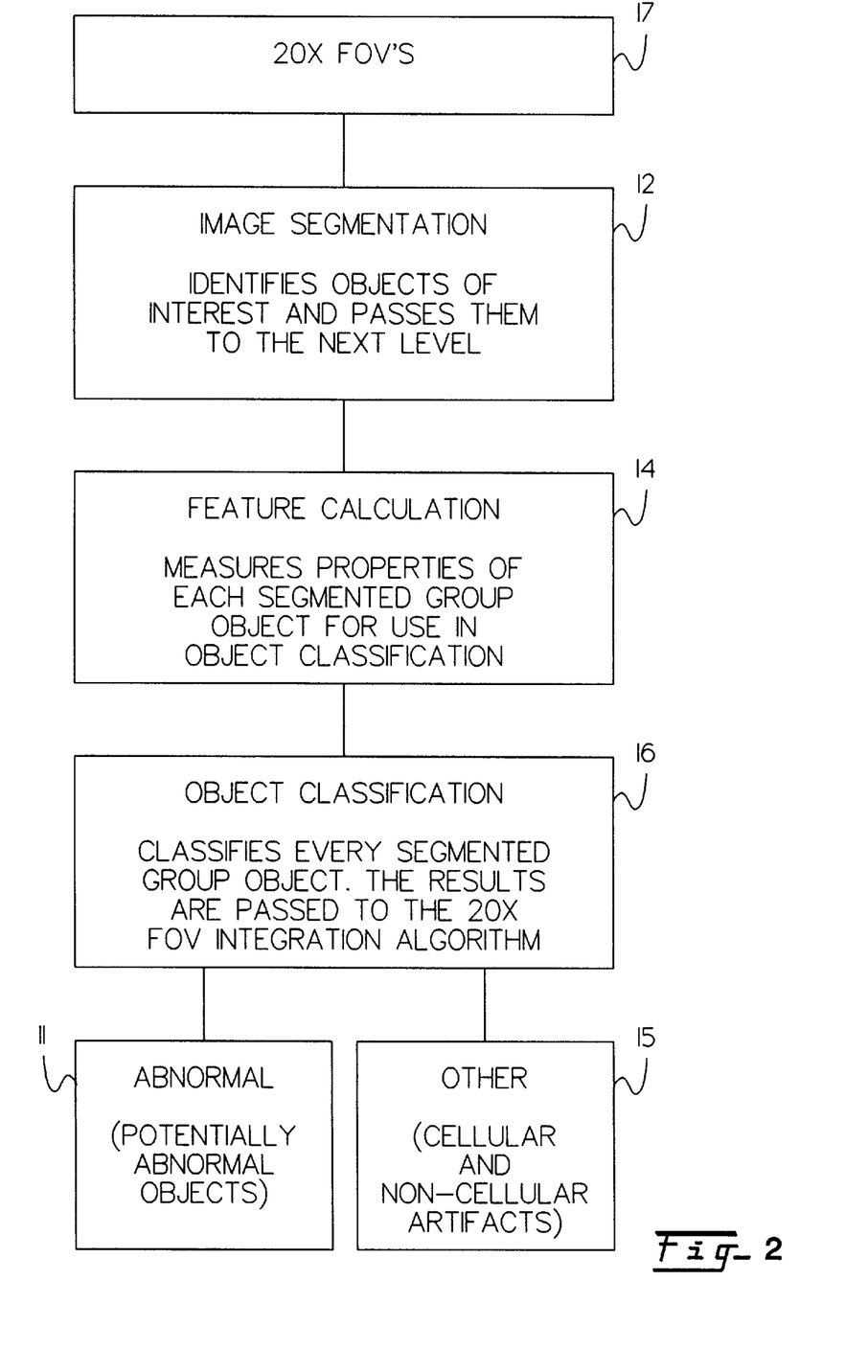
FIG. 2 shows a process flow diagram to process thick groups of cells.

Now refer to FIG. 2 which shows the thick group processing of the invention. An image of the biological specimen and whole image features are obtained 17. The 20× magnification images are received from the image capture and focus system 516, which is controlled by computer 562; some whole image features are received from the single cell analysis and group analysis.

The invention utilizes the following features from group classification. The magnitude of 2×1 dark edge in an FOV (feature #98).

These features are derived from single cell classification:

High mean (thick group feature #93)

Low threshold (thick group feature #95)

The classification results of thick group analysis are:

number of objects segmented number of objects eliminated by box filters number of objects eliminated by classification stages 1, 2 and 3 number of potentially abnormal objects remaining after the stage 3 classifier 5-bin confidence histogram of remaining, potentially abnormal objects Additionally, the invention performs error checking that does the following:

Checks for proper return code from the classifiers.

Performs a checksum on the number of objects classified. If an error is detected, the code aborts with an error message.

Prior to the thick group analysis the computer system 540 does the following:

Detects coverslip edges and excludes from image processing all areas that are outside of the area bounded by coverslip edges.

Accumulates slide level results from all 20× FOVs processed for thick groups for each slide.

Provides the scores to the user interface.

Controls image acquisition and assures that images passed for thick group analysis conform to image quality specifications. The invention checks that images are acquired based on predetermined rules.

Handles errors if they are identified during thick group processing.

The thick group processing of the invention identifies certain kinds of potentially abnormal cells that tend to occur in thick groups. These thick groups are collections of cells that are so densely clustered that it is difficult to distinguish individual nuclei. There are three major steps in processing:

Image Segmentation 12

Feature Calculation 14

Object Classification 16

Figure 4:
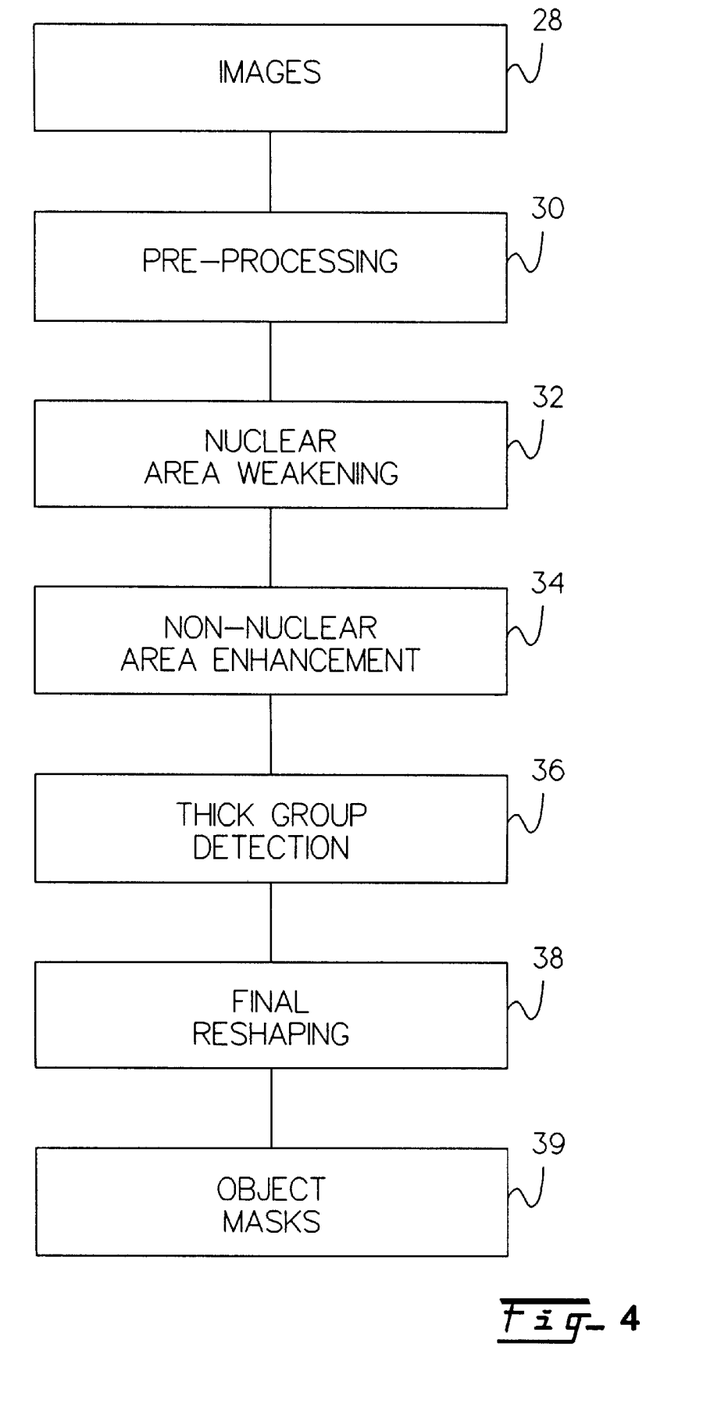
FIG. 4 shows a process flow diagram of the method of the invention to perform image segmentation.

Image segmentation 12 is the process of identifying objects of interest within a gray scale image and creating an object mask. An object mask is a binary image that represents the objects. Each area of interest is represented as active pixels in the object mask. Image segmentation, which is illustrated in more detail in FIG. 4, is a five step process.

The pre-processing stage 30 receives images 28 and eliminates single cells and detects nuclear grouping information. This information is used to integrate groups of cells into clusters. The information integration process uses the following image processing sequence:

| Operation | Input image location | Output image location | Structure element and size |
| --- | --- | --- | --- |
| Dilate | 1L | 1H | rod 7 × 1 |
| Erode | 1L | 1H | rod 9 × 1 |
| Dilate | 1H | 1H | rod 11 × 1 |
| Erode | 1H | 1H | rod 13 × 1 |
| Dilate | 1H | 1H | rod 15 × 1 |
| Erode | 1H | 1H | rod 17 × 1 |

Objects are subjected to a sequence of dilations and erosions. In each dilation and erosion operation, the structuring element is increased in size. This removes local, within cell, variations and isolates and highlights global, or inter-cell grouping information.

The nuclear area weakening stage 32 detects the nuclear area by taking the image created during the pre-processing step then subtracting the original image from it. The detected nuclear area is added to the pre-processing image to remove isolated nuclei. This operation tries to find thick cell group areas in which individual nuclei cannot be delineated; it then derives object masks from these areas.

Non-nuclear area enhancement 34 is designed to improve connectivity of the clusters. A sequence of morphological operations detects non-nuclear areas that are in close proximity to nuclei. Next, the non-nuclear area is subtracted from the weakened nuclear area image. The subtraction operation enhances the possibility of inclusion of these non-nuclear areas.

During thick group detection 36, a two-state conditional thresholding process detects areas containing potential thick groups of cells. First a "less than" threshold is applied to the enhanced image to detect seed regions. Seed regions roughly define the shape of the thick group mask. Seed regions are dilated by a disk with a radius of 13 pixels. As this "less than" threshold value is increased, more pixels are detected. A higher threshold is applied to detect all potential thick group regions. These images are combined by finding pixels that are common to both the higher threshold and dilated images.

Opening, which is a simple binary morphological operation, reshapes objects to smooth boundaries and remove small regions in step 38. A disk with a radius of 13 pixels is used as the structuring element for the opening. The result of opening is the final result of image segmentation, which creates thick group object masks 39.

Refer again to FIG. 2, Features are calculated according to a pre-established protocol in step 14. Features are computed based either on portions of an image as defined by an object mask, or based on the whole image. Object based features are numerical values that correspond to some aspects of a thick group's presentation. For example, area is a feature that gives the size, in pixels, of a thick group of cells; fov_brightness is a whole image feature that provides information about the average brightness of an entire 20× FOV.

Object Classification 16 is accomplished using sets of features in a linear combination, then thresholding the result. A series of these combinations is integrated in a tree structure that together form a Fisher's linear binary decision tree classifier. Several classifiers are used in series to form the overall algorithm. The goal is for early classifiers to eliminate the majority of objects that are thick groups of cells of normal cells or artifacts that resemble thick groups of cells. The invention classifies these groups of objects as "other" 15. Objects that remain are more likely to be classified as potentially abnormal 11.

The invention eliminates 99% of artifact or normal cellular thick groups of cells, while retaining 33% of potentially abnormal thick groups of cells.

Many types of abnormal cellular conditions tend to form in thick groups of cells. During training, the invention is designed to identify the following cell group types as potentially abnormal: adenocarcinoma and atypia of the endocervix and endometrium, general adenocarcinoma, adenocarcinoma in situ, atypical glandular cell of unidentified significance (AGUS), repair and reactive states of endocervical cells, herpes, and high-grade squamous intraepithelial lesions. All these cell types tend to appear in thick groups.

Figure 5:
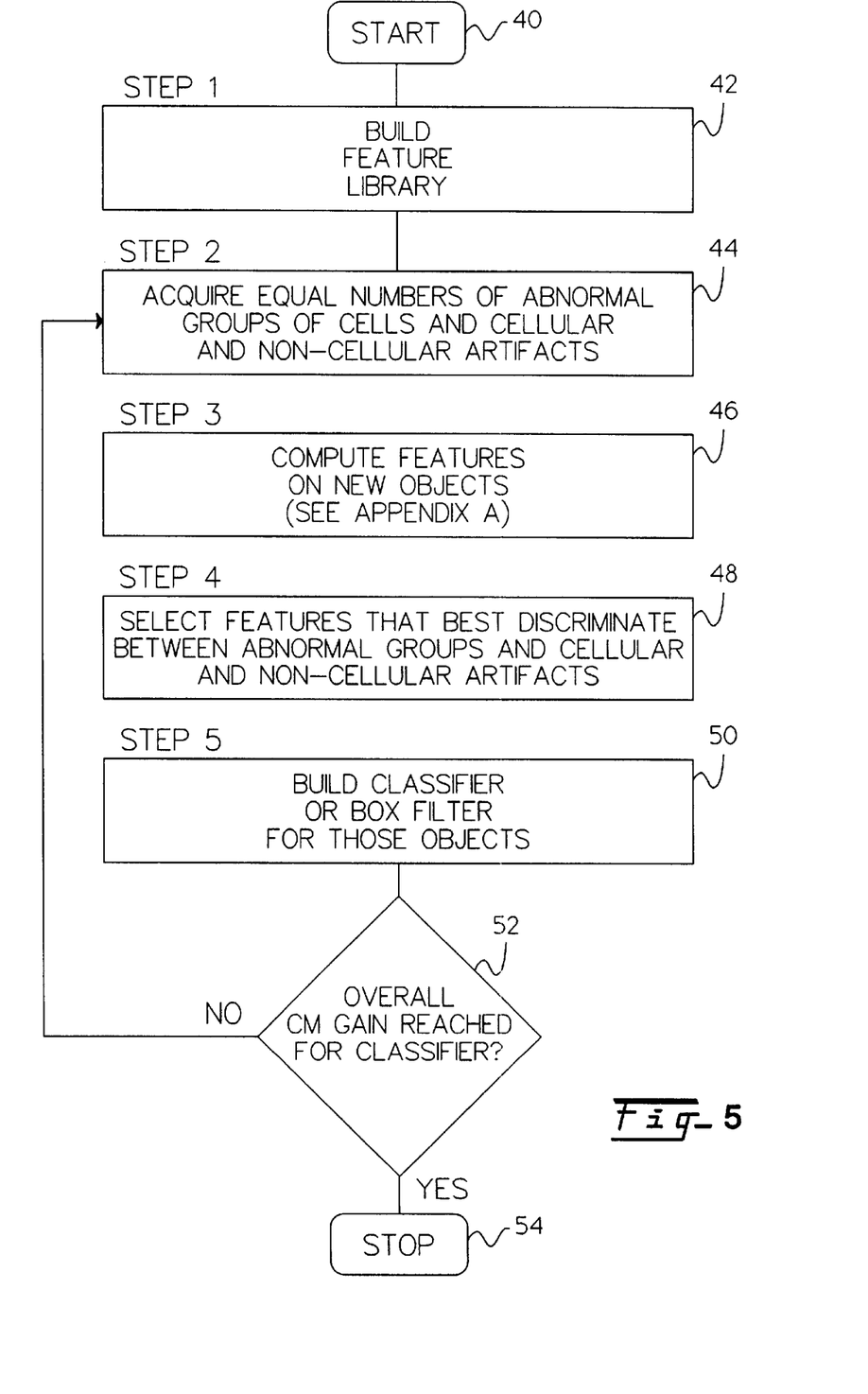
FIG. 5 shows a process flow diagram of the training method of the invention.

There are five major steps in invention training, as shown in FIG. 5 starting at step 40. Step 42 is to build a library of features that can be used to separate potentially abnormal objects from objects that are artifacts or normal cells. Step 44 acquires objects used to train a given stage of processing. Step 46 computes features identified in the feature library on new objects. Step 48 selects those features in the feature library that most effectively separate objects in the training set. Step 50 builds a given stage of classifier based on the selected features. Steps 44 through 50 may be repeated several times until an overall CM gain is reached for the classifier in step 52. The process then stops 54. Feature identification, object acquisition, feature selection, and object classification are described later in this section.

Thick group processing classifies as potentially abnormal those abnormal conditions listed in Table 1. In general, the invention discards normal cellular groups.

The invention uses features that are compatible with endocervical group analysis. However, the invention uses only those features that do not involve nuclear segmentation.

A wide range of features is necessary to properly discriminate segmented groups. Features used can be categorized in two different ways:

They can be identified by the kind of information they measure—object shape, size, and texture, and so forth.

They can be identified by what part of an image they measure—the object of interest, a small area around the object, or the whole image.

For algorithm training, about equal numbers of normal or artifact groups, "other", and abnormal groups were acquired. The abnormal classification includes all objects that are groups of potentially abnormal cells configured in thick groups. The other classification includes artifacts and groups of normal cells. See Table 1 for identification of the abnormalities and other conditions used for training.

To manually acquire objects, a cytotechnologist screens abnormal slides and circles areas containing abnormal thick groups. These slides are then placed in the apparatus of the invention, and the abnormal thick group is positioned underneath the objective lens. The video cameras capture an image at 20×. Later, a cytopathologist verifies the diagnosis of the group. Once verified, these images become a part of the manual cell library that contains a number of images of conditions.

Other normal cell thick groups and all artifact groups were obtained by implementing the classifier as a prototype machine running with normal slides. That process yielded a set of objects that passed the classifier at a given stage in its development. At the beginning of machine development, only the segmenter was implemented in code. The slides were processed and fields of view were saved in which at least one thick group was segmented. These field of views were reviewed by a cytotechnologist and placed in one of the object categories listed in Table 1.

Based on this data, a given stage in the classification process was built and coded. As indicated by FIG. 5, the process is again repeated, except now only those objects that pass the most recent classifier were used to train the next stage.

Once a training set has been constructed for a given stage, it is necessary to select the features that are best able to discriminate between object classes. Feature sets were determined using SAS' stepwise discriminant analysis. The measure used to select features was Wilkes' lambda. A definition for this measure and the underlying theory governing the discriminant process is given in the SAS/STAT User's Guide, Volume 2, pp 1493–1509.

Step 44 of FIG. 5 describes the process of constructing a data set that is used to train a classifier. Each object is given a label as shown in Table 1. The task of the classifier is to establish decision boundaries so that the assigned classification most often matches the abnormal or other label given in Table 1. Selected features are used in a linear combination and thresholded. When several such combinations are combined in a binary tree structure, they form a Fisher's linear binary decision tree classifier. For a more detailed account of the Fisher's linear decision tree and the process used to build them, refer to the paper "A Binary Decision Tree Classifier" by Joo and Haralick in Machine Vision International, Feb. 19, 1986.

In addition to Fisher's linear decision trees, the thick group method of the invention uses box filters. These filters are implemented in the form:

$$0 = a0*(\text{feature2}) + a1 - \text{feature1}$$

where a0, a1=constants
feature 1, feature2=feature values

If the expression is true, the object is classed as an artifact and stops further classification.

Box filters are trained on abnormal cell populations and specific artifact types because a significant portion of the artifact feature distribution does not overlap with the abnormal distribution, even in two-dimensional space. Therefore, box filters may be used to eliminate a substantial portion of artifacts at a small expense in both processing time and loss of potentially abnormal objects.

Figure 6:
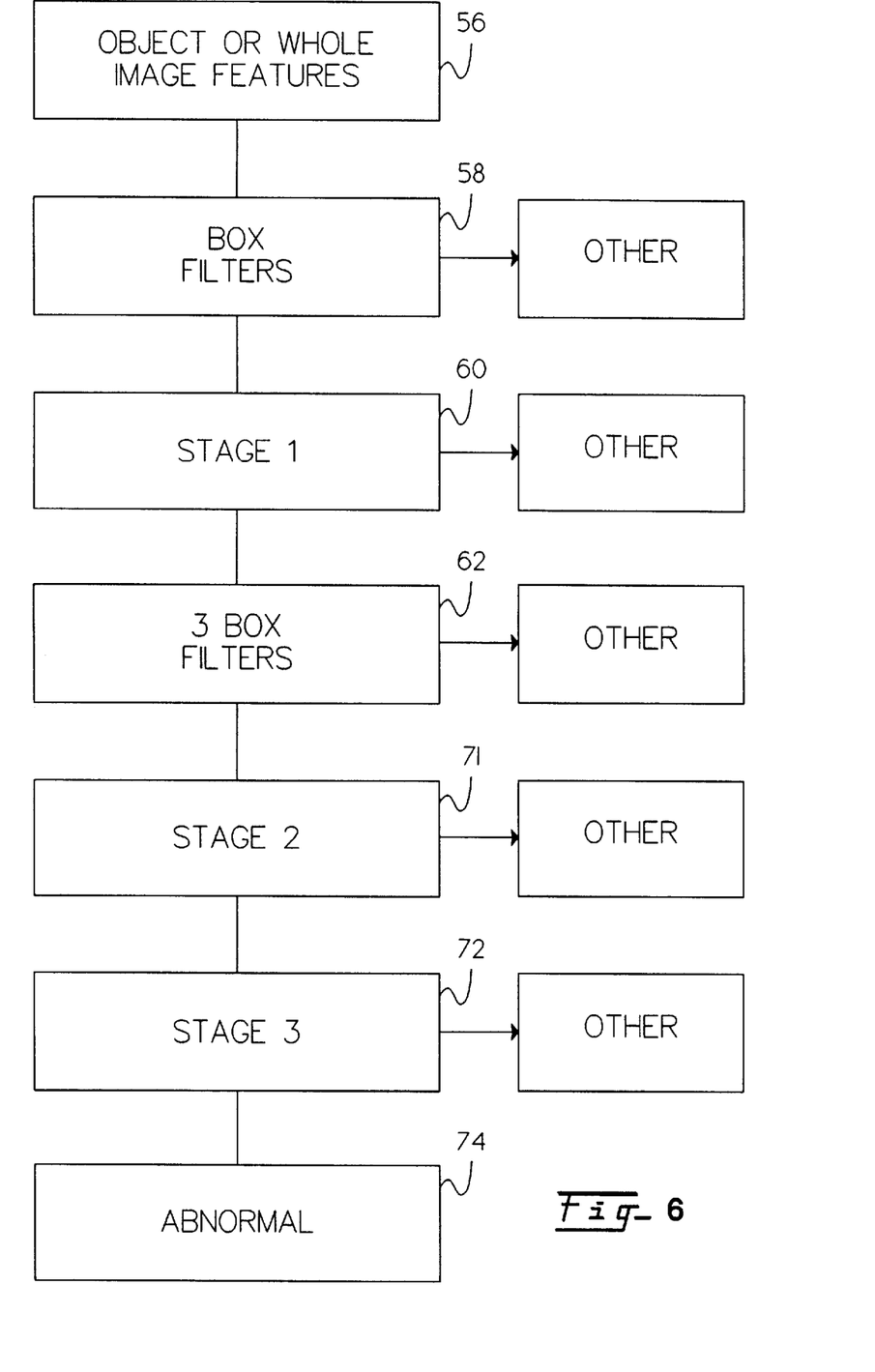
FIG. 6 shows a process flow diagram of the object classification method of the invention.

FIG. 6 shows a flowchart of the thick group analysis method of the invention for object or whole image features 56. The graphic shows that the first step 58 is a series of box filters intended to reject obvious artifact groups. Next, three Fisher's linear decision tree classifiers (stages 1–3) are used in series to refine the classification of potentially abnormal thick groups. Note that three box filters 62 precede the stage 2 classifier 71. These were defined because, after artifact collection that followed the design of the stage one classifier 60, a review of feature pair values indicated that these filters could eliminate a large percentage of normal/artifact objects. Following are more detailed descriptions of the classifiers used and the number of samples used to train them. Box Filters 58 are the first step in object classification. A series of box filters are designed to remove obvious artifacts. Features are used in pairs by the box filters, which are structured to eliminate commonly occurring artifacts that may resemble segmented groups of abnormal cells 74.

There are 10 box filters that are applied in six areas the number of a particular type of filter appears in parenthesis. The features mentioned in the text below will be described under "Thick Group Feature Descriptions" below.

Area box filter (1)

This filter establishes whether a potential group is larger than 1,000 pixels. Only groups of that size and larger are considered as potential thick groups. This filter is a part of the image segmenter.

Whole image feature box filters (2)

Two whole image-based boxes are used to reject all kinds of artifacts. These artifacts, called other by the algorithm, include cellular artifacts, non-cellular artifacts, and groups of normal cells that are present as thick groups. If:

$$0 \geq -1.11 \times \text{feature}93 + 262 - \text{feature}106$$

$$0 \leq 0.05 \times \text{feature}96 + 8 - \text{feature}106$$

then the object is classified as other. If not, the object is passed to the next box filter.

Out-of-focus box filters (3)

Three out-of-focus box filters are used to eliminate any segmented objects that are not properly in focus. These out-of-focus box filters are designed to remove objects that were poorly focused during image acquisition. Since identification of out-of-focus objects is unreliable, the algorithm should not attempt to classify them. The out-of-focus filter, the cytoplasm filter, the graphite filter, and the poly filter use one object feature in combination with either a whole image feature or another object-based feature: If:

$$0 \leq -0.0027 \times \text{feature}70 + 0.427 - \text{feature}7$$

$$0 \leq -0.185 \times \text{feature}70 + 54.7 - \text{feature}119$$

$$0 \leq 0.148 \times \text{feature}100 + 0.459 - \text{feature}8$$

then the object is classified as other. If not, the object is passed to the next box filter.

Cytoplasm box filters (2)

The algorithm uses two box filters to eliminate as many objects as possible that are cytoplasm only artifacts: If:

$$0 \geq 27.3 \times \text{feature}98 + 218.4 - \text{feature}93$$

$$0 \leq -380 \times \text{feature}11 + 142 - \text{feature}119$$

then the object is classified as other. If not, the object is passed to the next box filter.

The graphite filter (1)

This filter removes objects that are graphite artifacts. Glass laboratory slides of Pap smears commonly contain artifacts that prove to be graphite particles left by pencils: If:

$$0 \geq -12.2 \times \text{feature}33 + 106.11 - \text{feature}95$$

then the object is classified as other. If not, the object is passed to the next box filter.

Poly filter

The purpose of the poly filter is to eliminate segmented objects that are polymorphonucleocytes white blood cells: If:

$$0 \geq 0.02 \times f96 + 8.5 - \text{feature}22$$

then the object is classified as other. If not, the object is passed to the next box filter.

Stage 1 Classifier

The stage 1 classifier is a Fisher's linear binary decision tree. The stage 1 classifier 60 is designed to separate other objects—thick groups of normal cells as well as cellular and non-cellular artifacts—from potentially abnormal groups. Stage 1's feature set consists of the following 14 features:

| feature 7 | clus_light_2_dir | feature 79 | plus_edge_17_17 |
|---|---|---|---|
| feature 8 | clus_light_5_mag | feature 89 | plus_blur_15_15_sd |
| feature 22 | clus_edge_9_9 | feature 93 | high_mean |
| feature 24 | clus_blur_3_3_ave | feature 98 | clus_edge_2_mag |
| feature 25 | clus_blur_3_3_sd | feature 100 | clus_edge_5_mag |
| feature 70 | cluster + brightness | feature 107 | clus_blue_3_3_ave |
| feature 78 | plus_edge_9_9 | feature 119 | image_sd |

The features are described in Table 4.

Stage 2 Box Filters

Two pre-stage 2 box filters reject artifacts that made it through the box filters and stage 1.

The box filters are implemented by the following rules, where if the statement is true the object is rejected as artifact/normal:

$$0 \leq 0.6 \; \text{feature}102 - 1.04 - \text{feature}112$$

$$0 \leq 0.025 \; \text{feature}13 + 0.21 - \text{feature}66$$

$$0 \leq 0.025 \; \text{feature}121 + 0.099 - \text{feature}42$$

Stage 2 Classifier

The stage 2 classifier 71 is a Fisher's linear decision tree. Stage 2 uses the following 16 features:

| feature 1 | image_sd | feature 81 | plus_blur_3_3_sd |
|---|---|---|---|
| feature 8 | clus_light_5_mag | feature 88 | plus_blur_15_15_ave |
| feature 30 | clus_blur_7_7_sk | feature 93 | high_mean |
| feature 58 | ring_blur_7_7_sk | feature 104 | clus_edge_5_5 |
| feature 66 | ring_polar_max | feature 107 | clus_blur_3_3_ave |
| feature 70 | plus_brightness | feature 119 | image_sd |
| feature 78 | plus_edge_9_9 | feature 120 | image_sk |
| feature 79 | plus_edge_17_17 | feature 121 | image_ku |

Stage 3 Classifier

The Stage 3 classifier 72 is a Fisher's linear decision tree. Stage 3 uses the following 9 features:

| feature 1 | area | feature 24 | clus_blur_3_3_ave |
|---|---|---|---|
| feature 12 | clus_light_3_3 | feature 32 | clus_blur_15_15_ave |
| feature 15 | clus_edge_2_mag | feature 67 | ring_polar_max_45 |
| feature 16 | clus_edge_2_dir | feature 93 | low_threshold |
| feature 19 | clus_edge_9_mag | | |

The thick group algorithm sends its accumulated results to a 20× FOV integration algorithm. Its seven outputs are:

1. Number of objects eliminated by box filters.
2. Number of objects eliminated by the stage 1 classifier 60.
3. Number of objects eliminated by the stage 2 classifier 71.
4. Number of objects eliminated by the stage 3 classifier 72.
5. Number of potentially abnormal objects that remain after stage 3.
6. A bin confidence histogram of the remaining objects, which are potentially abnormal cell groups. Confidence reflects the likelihood of an object being abnormal and, as such, ranges from 0.5 to 1.0. Each node in the decision tree is assigned a confidence value based on results during training. For example, a confidence value of 0.9 would be assigned to a given node if it were found that during training, 90 percent of the objects that terminated in that node were abnormal objects. During normal operation, if an object terminated in this node, the object would be classed as potentially abnormal, and the 5th bin in the confidence histogram (for confidence of 0.9 to 1.0) would be incremented. The range of confidence values assigned to each bin are as follows:
Bin1 0.5<=confidence<0.6
Bin2 0.6<=confidence<0.7
Bin3 0.7<=confidence<0.8
Bin4 0.8<=confidence<0.9
Bin5 0.9<=confidence<=1.0
Since only the confidence histogram is retained on a slide it is not possible to obtain the confidence assigned to any one abnormal object.
7. The invention checks to make certain that a proper return was made from the classifiers and performs a checksum to make certain that the number of objects processed is correct. Detection of an error causes an error message to be printed, the algorithm to be aborted, and a −1 returned to the algorithm dispatcher.

Thick Group Feature Library

Table 4 lists the entire library of features that were used in thick group algorithm development and classifier training. Detailed descriptions of the features used by thick group processing follow Table 4. Features computed for thick groups are a subset of those computed for group objects. In the following table, feature numbers for the thick group features are cross-referenced to the feature number for the same feature used by the group processing.

The characters in the Type column indicate the feature type: o indicates an object; i indicates a whole image.

TABLE 4

Thick Group Feature Library

| Thick Group Number | Feature Name |
| --- | --- |
| feature 1 | Cluster area |
| feature 2 | Cluster compactness |
| feature 4 | Standard deviation of cluster intensity |
| feature 5 | Cluster brightness |
| feature 6 | Magnitude of 2 × 1 bright edge in cluster |
| feature 7 | Directional disparity of 2 × 1 bright edge in cluster |
| feature 8 | Magnitude of 5 × 1 bright edge in cluster |
| feature 9 | Directional disparity of 5 × 1 bright edge in cluster |
| feature 10 | Magnitude of 9 × 1 bright edge in cluster |
| feature 11 | Directional disparity of 9 × 1 bright edge in cluster |
| feature 12 | 3 × 3 bright edge in cluster |
| feature 13 | 9 × 9 bright edge in cluster |
| feature 14 | 17 × 17 bright edge in cluster |
| feature 15 | Magnitude of 2 × 1 dark edge in cluster |
| feature 16 | Directional disparity of 2 × 1 dark edge in cluster |
| feature 17 | Magnitude of 5 × 1 dark edge in cluster |

TABLE 4-continued

Thick Group Feature Library

| Thick Group Number | Feature Name |
| --- | --- |
| feature 18 | Directional disparity of 5 × 1 dark edge in cluster |
| feature 19 | Magnitude of 9 × 1 dark edge in cluster |
| feature 20 | Directional disparity of 9 × 1 dark edge in cluster |
| feature 21 | 5 × 5 dark edge in cluster |
| feature 22 | 9 × 9 dark edge in cluster |
| feature 23 | 17 × 17 dark edge in cluster |
| feature 24 | 3 × 3 blur residue mean in cluster |
| feature 25 | 3 × 3 blur residue standard deviation in cluster |
| feature 26 | 3 × 3 blur residue skewness in cluster |
| feature 27 | 3 × 3 blur residue kurtosis in cluster |
| feature 28 | 7 × 7 blur residue mean in cluster |
| feature 29 | 7 × 7 blur residue standard deviation in cluster |
| feature 30 | 7 × 7 blur residue skewness in cluster |
| feature 31 | 7 × 7 blur residue kurtosis in cluster |
| feature 32 | 15 × 15 blur residue mean in cluster |
| feature 33 | 15 × 15 blur residue standard deviation in cluster |
| feature 34 | 15 × 15 blur residue skewness in cluster |
| feature 35 | 15 × 15 blur residue kurtosis in cluster |
| feature 36 | Polarity area in cluster |
| feature 37 | Polarity range in cluster |
| feature 38 | Polarity maximum in cluster |
| feature 39 | Polarity in maximum direction + 45° in cluster |
| feature 40 | Polarity in maximum direction + 90° in cluster |
| feature 41 | Polarity in maximum direction + 135° in cluster |
| feature 42 | Normalized cluster brightness |
| feature 43 | Magnitude of 2 × 1 dark edge in normalized cluster |
| feature 44 | Directional disparity of 2 × 1 dark edge in normalized cluster |
| feature 45 | Magnitude of 5 × 1 dark edge in normalized cluster |
| feature 46 | Directional disparity of 5 × 1 dark edge in normalized cluster |
| feature 47 | Magnitude of 9 × 1 dark edge in normalized cluster |
| feature 48 | Directional disparity of 9 × 1 dark edge in normalized cluster |
| feature 49 | 5 × 5 dark edge in normalized cluster |
| feature 50 | 9 × 9 dark edge in normalized cluster |
| feature 51 | 17 × 17 dark edge in normalized cluster |
| feature 52 | 3 × 3 blur residue mean in normalized cluster |
| feature 53 | 3 × 3 blur residue standard deviation in normalized cluster |
| feature 54 | 3 × 3 blur residue skewness in normalized cluster |
| feature 55 | 3 × 3 blur residue kurtosis in normalized cluster |
| feature 56 | 7 × 7 blur residue mean in normalized cluster |
| feature 57 | 7 × 7 blur residue standard deviation in normalized cluster |
| feature 58 | 7 × 7 blur residue skewness in normalized cluster |
| feature 59 | 7 × 7 blur residue kurtosis in normalized cluster |
| feature 60 | 15 × 15 blur residue mean in normalized cluster |
| feature 61 | 15 × 15 blur residue standard deviation in normalized cluster |
| feature 62 | 15 × 15 blur residue skewness in normalized cluster |
| feature 63 | 15 × 15 blur residue kurtosis in normalized cluster |
| feature 64 | Polarity area in ring around cluster |
| feature 65 | Polarity range in ring around cluster |
| feature 66 | Polarity maximum in ring around cluster |
| feature 67 | Polarity in maximum direction + 45° in ring around cluster |
| feature 68 | Polarity in maximum direction + 90° in ring around cluster |
| feature 69 | Polarity in maximum direction + 135° in ring around cluster |
| feature 70 | cluster + brightness |
| feature 71 | Magnitude of 2 × 1 bright edge in cluster+ |
| feature 72 | Directional disparity of 2 × 1 dark edge in cluster+ |
| feature 73 | Magnitude of 5 × 1 dark edge in cluster+ |
| feature 74 | Directional disparity of 5 × 1 dark edge in cluster+ |
| feature 75 | Magnitude of 9 × 1 dark edge in cluster+ |
| feature 76 | Directional disparity of 9 × 1 dark edge in cluster+ |
| feature 77 | 5 × 5 dark edge in cluster+ |
| feature 78 | 9 × 9 dark edge in cluster+ |
| feature 79 | 17 × 17 dark edge in cluster+ |
| feature 80 | 3 × 3 blur residue in cluster+ |
| feature 81 | 3 × 3 blur residue standard deviation in cluster+ |
| feature 82 | 3 × 3 blur residue skewness in cluster+ |
| feature 83 | 3 × 3 blur residue kurtosis in cluster+ |
| feature 84 | 7 × 7 blur residue mean in cluster+ |
| feature 85 | 7 × 7 blur residue standard deviation in cluster+ |
| feature 86 | 7 × 7 blur residue skewness in cluster+ |
| feature 87 | 7 × 7 blur residue kurtosis in cluster+ |
| feature 88 | 15 × 15 blur residue mean in cluster+ |
| feature 89 | 15 × 15 blur residue standard deviation in cluster+ |
| feature 90 | 15 × 15 blur residue skewness in cluster+ |

TABLE 4-continued

Thick Group Feature Library

| Thick Group Number | Feature Name |
|---|---|
| feature 91 | 15 × 15 blur residue kurtosis in cluster+ |
| feature 92 | SIL high_count variable |
| feature 93 | SIL high_mean variable |
| feature 94 | SIL medium_threshold variable |
| feature 95 | SIL low_threshold variable |
| feature 96 | FOV brightness |
| feature 97 | FOV edge |
| feature 98 | Magnitude of 2 × 1 dark edge in FOV |
| feature 99 | Directional disparity of 2 × 1 dark edge in FOV |
| feature 100 | Magnitude of 5 × 1 dark edge in FOV |
| feature 101 | Directional disparity of 5 × 1 dark edge in FOV |
| feature 102 | Magnitude of 9 × 1 dark edge in FOV |
| feature 103 | Directional disparity of 9 × 1 dark edge in FOV |
| feature 104 | 5 × 5 dark edge in FOV |
| feature 105 | 9 × 9 dark edge in FOV |
| feature 106 | 17 × 17 dark edge in FOV |
| feature 107 | 3 × 2 blur residue mean |
| feature 108 | 3 × 3 blur residue standard deviation in FOV |
| feature 109 | 3 × 3 blur residue skewness in FOV |
| feature 110 | 3 × 3 blur residue kurtosis in FOV |
| feature 111 | 7 × 7 blur residue mean in FOV |
| feature 112 | 7 × 7 blur residue standard deviation in FOV |
| feature 113 | 7 × 7 blur residue skewness in |
| feature 114 | 7 × 7 blur residue kurtosis in FOV |
| feature 115 | 15 × 15 blur residue mean in FOV |
| feature 116 | 15 × 15 blur residue standard deviation in FOV |
| feature 117 | 15 × 15 blur residue skewness in FOV |
| feature 118 | 15 × 15 blur residue kurtosis in FOV |
| feature 119 | Whole image standard deviation |
| feature 120 | Whole image skewness |
| feature 121 | Whole image kurtosis |

Thick Group Feature Descriptions

The following are feature descriptions for all features that were selected from the feature library during training. They are arranged by thick group feature number (Feature 1 through Feature 121). Thick group features are cross referenced with the feature name and the feature type. Features of type "O" are based on the object segmentation mask, whereas objects of type "i" are based on the entire 20× FOV.

Feature Descriptions

| Feature Number | Feature Name | Type |
|---|---|---|
| feature1 | area | O |

Feature 1 is the area, in pixels, of the cluster mask. Feature 1 is used by the stage 2 and stage 3 classifiers.

| | | |
|---|---|---|
| feature7 | clus_light_2_dir | O |

Feature 7 is the 2×1 (2 pixels horizontally by 1 pixel vertically) bright edge directional disparity within the cluster. Bright edge directional disparity is a combination of two measures. Pixels are examined to find those that have darker neighbors on both sides horizontally, then those that have darker neighbors vertically. For each pixel that passes the neighbor test, the magnitude of the difference is recorded. The magnitude of differences for all horizontal pixels are summed. Then all pixels in the vertical are summed. Feature 7 is calculated as the minimum of these two values divided by the sum of the two. It provides a measure of whether there are significantly more relatively bright pixels in one direction versus the other. This feature shows whether there is some directionally dominant texture in the cluster. In this case, the texture is very fine, or of a high spatial frequency. Feature 7 is used by one of the out-of-focus box filters and by the stage 1 classifier.

| | | |
|---|---|---|
| feature8 | clus_light_5_mag | O |

Feature 8 is the 5×1 bright edge magnitude. As with the directional disparity described in Feature 7, this measure is made up of two directions: horizontal and vertical. In this case, rather than looking for pixels that are surrounded by dark pixels in one direction, groups of three pixels are examined to see if they are bounded by dark pixels on both sides horizontally and vertically. Feature 8 is calculated by squaring the two measures, summing them, then taking their square root. This feature gives a measure of how much edge there is in the cluster that is about three pixels wide in either direction. It also gives a measure for the amount of texture there is that has bright spots about three pixels in size. Feature 8 is used by one of the out-of-focus box filters, and by the stage 1 and stage 2 classifiers.

| | | |
|---|---|---|
| feature11 | clus_light_9_dir | O |

Feature 11 is similar to feature 7 except that groups of seven pixels are checking for dark neighbors rather than a single pixel. Feature 11 is used by the cytoplasm box filter.

| | | |
|---|---|---|
| feature12 | clus_light_3_3 | O |

Feature 12 is the 3×3 bright edge strength in the cluster. The algorithm searches for pixels that have dark pixels around them in all directions. The difference between the bright pixel and its surrounding pixels are accumulated for all such pixels in the cluster. The accumulated figure is normalized by the total number of pixels in the cluster. This measures the amount of texture in each cluster that consists of bright regions about one pixel in size that are surrounded by darker pixels on all sides. Feature 12 is used by the poly box filter.

| | | |
|---|---|---|
| feature13 | clus_light_9_9 | O |

Feature 13 is similar to feature 12 except that groups of pixels, 7×7 in size, are checked for darker neighbors. Feature 13 is used by the stage 2 pre-box filter.

| | | |
|---|---|---|
| feature15 | clus_edge_2_mag | O |

Feature 15 is the magnitude of the 2×1 dark edge. This feature is the same as Feature 8 except that single, dark pixels are searched for rather than bright regions 3 pixels wide. This measure is of the total amount of dark area covered by single pixels bounded in two directions by bright area. Feature 15 is used by the stage 3 classifier.

| | | |
|---|---|---|
| feature16 | clus_edge_2_dir | O |

Feature 16 is the directional disparity of 2×1 dark edge in cluster. The feature is similar to feature 7 with the exception that the pixels are examined to find those that have brighter neighbors. This feature is used by the stage 3 classifier.

| | | |
|---|---|---|
| feature19 | clus_edge_9_mag | O |

Feature 19 is the magnitude of the 9×1 dark edge. This is the same as feature 15 except that regions of 7 pixels in width or height are searched for that have bright neighbors. This feature is used by the stage 3 classifier.

| | | |
|---|---|---|
| feature22 | clus_edge_9_9 | O |

Feature 22 is 9×9 dark edge strength. This is the same as feature 12 except that pixels with brighter neighbors are searched for and the size of the dark region searched for is about 7×7. The texture this feature measures are dark spots about 4 microns on a side. Feature 22 is used by the poly box filter and by the stage 1 classifier.

| | | |
|---|---|---|
| feature24 | clus_blur_3_3_ave | O |

Feature 24 is called mean 3×3 blur residue in the cluster. The algorithm measures the absolute difference between a 3×3 binomial filtered image and its original. The average pixel value of this difference is feature 24. This feature measures high spatial frequency in the cluster. Feature 24 is used by the stage 1 and stage 2 classifiers.

| | | |
|---|---|---|
| feature25 | clus_blur_3_3_sd | O |

Feature 25 is the standard deviation of the 3×3 blur residue in the cluster. This measure gives some indication of how uniform high spatial frequencies are within the cluster. Feature 25 is used by the stage 1 classifier.

| | | |
|---|---|---|
| feature30 | clus_blur_7_7_sk | O |

Feature 30 is the 7×7 blur residue skewness in cluster. The image is blurred using a 7×7 structure element. The difference between this and the original image is taken. The feature is the skewness of this difference in the area defined by the object mask. Feature 30 is used by the stage 2 classifier.

| | | |
|---|---|---|
| feature32 | clus_blur_15_15_ave | O |

Feature 32 is the 15×15 blur residue mean in cluster. It is similar to feature 24 except that this feature uses a 15×15 structure element to perform the filtering. Feature 32 is used by the stage 3 classifier.

| | | |
|---|---|---|
| feature33 | clus_blur_15_15_sd | O |

Feature 33 is similar to feature 32 except that standard deviation is computed. Feature 33 is used by the graphite box filter.

| | | |
|---|---|---|
| feature42 | ring_brightn | O |

Feature 42 is the average brightness of the normalized cluster. The average intensity of the cluster is divided by the average intensity of the ring around the cluster. This ratio is average brightness. Feature 42 is used by the pre-stage 2 box filters.

| | | |
|---|---|---|
| feature58 | ring_blur_7_7_sk | O |

Feature 58 is the 7×7 blur residue skewness. This is the ratio of the 7×7 blur residue skewness of the cluster to that of the ring around the cluster. This ratio indicates how texture variations compare from the cluster to the ring around the cluster. It identifies changes in texture from the cluster to the ring around the cluster. It also provides a measure of how similar the cluster is to its background when its spatial frequencies have been eliminated by a 7×7 filter. Feature 58 is used by the stage 2 classifier.

| | | |
|---|---|---|
| feature66 | ring_polar_max | O |

Feature 66 is the maximum polarity in the ring around the cluster. This feature measures the amount of dark ovoid area that is within the ring around the cluster. The polarity is broken down into its maximum direction, its direction perpendicular to the maximum, and its direction to 45 degrees on either side of the maximum. Polarity in the maximum direction in the ring around the cluster gives the value for feature 66. Feature 66 is used by the pre-stage 2 box filters and by the stage 2 classifier.

| | | |
|---|---|---|
| feature67 | ring_polar_max_45 | O |

Feature 67 is polarity in maximum direction plus 45 degrees in ring around cluster. Similar to feature 66 except the polarity is in the direction of the maximum plus 45 degrees. Feature 67 is used by the stage 3 classifier.

| | | |
|---|---|---|
| feature70 | plus_brightness | O |

Feature 70 is cluster plus brightness. This is the average intensity of the pixels in the expanded cluster. Feature 70 is used by the stage 1 classifier.

| feature78 | plus_edge_9_9 | o |

Feature 78 is called 9×9 dark edge strength. This is the same as feature 22 except that it's calculated in the expanded cluster rather than in the cluster. Feature 78 is used by the stage 1 classifier and by the stage 2 classifier.

| feature79 | plus_edge_17_17 | o |

Feature 79 is a 17×17 dark edge in a cluster. The feature is the same as feature 78 except a 17×17 dark region is searched for. Feature 79 is used by the stage 1 and stage 2 classifiers.

| feature81 | plus_blur_3_3_sd | o |

Feature 81 is a 3×3 blur residue standard deviation in the expanded cluster. The difference between the original image and the image blurred by a 3×3 filter is taken. The feature is the standard deviation of the pixels in the expanded cluster. Feature 81 is used by the stage 2 classifier.

| feature88 | plus_blur_15_15_ave | o |

Feature 88 is 15×15 blur residue mean in the expanded cluster. The difference between the original image and the image blurred by a 15×15 filter is taken. The feature is the standard deviation of the pixels in the expanded cluster. Feature 88 is used by the stage 2 classifier.

| feature89 | plus_blur_15_15_sd | o |

Feature 89 is a 15×15 blur residue standard deviation in the expanded cluster. Similar to feature 81 except a 15×15 filer is used. Feature 89 is used by the stage 1 classifier.

| feature93 | high_mean | i |

Feature 93 is the single cell algorithm's high_mean variable measurement. This is the average value of all pixels in an image that have values between 199 and 250. This feature provides some information about an image's background. Feature 93 is used by one of the cytoplasm box filters, and by the stage 1 and stage 2 classifiers.

| feature95 | low_threshold | i |

Feature 95 is the single cell algorithm's low_threshold value. This value is calculated during single cell segmentation. It is the result of an adaptive threshold calculation for a certain range of pixel intensities in an image. It gives a measure for how much dark matter there is in an image. If the threshold is low, there is a fair amount of dark matter in the image. If the threshold is high, there are probably few high density objects in the image. Feature 95 is used by the graphite box filter and the stage 3 classifier.

| feature98 | clus_edge_2_mag | i |

Feature 98 is the magnitude of the 2×1 dark edge in an image. This feature is calculated in the same way as feature 15 except that it is calculated over the whole image. Feature 98 is used by the stage 1 classifier.

| feature100 | clus_edge_5_mag | i |

Feature 100 is the magnitude of the 5×1 dark edge in an FOV. This feature is calculated the same way as feature 15 except that dark 3-pixel regions are searched for instead of single dark pixel. Feature 100 is used by the stage 1 classifier.

| feature104 | clus_edge_5_5 | i |

Feature 104 is 5×5 dark edge strength. This feature is computed by finding 3×3 clusters of pixels that are surrounded by brighter pixels. The difference between the surrounding pixels and each pixel in the cluster is computed. This difference is accumulated for all the pixels in the cluster and normalized by the number of pixels in the whole image. The feature characterizes texture with dark spots that measure 1 to 2 microns on a side. Feature 104 is used by the stage 2 classifier.

| feature106 | clus_edge_17_17 | i |

Feature 106 is a 17×17 dark edge strength. This feature is the same as feature 104 except that the accumulation is based on clusters that are 17×17 pixels in size. Feature 106 is used by the area box filter and by two whole image box filters.

| feature107 | clus_blur_3_3_ave | i |

Feature 107 is a 3×3 blur residue mean. This is calculated the same way as feature 24 except that the feature is calculated over the entire image rather than just over the cluster. Feature 107 is used by the stage 1 and stage 2 classifiers.

| feature109 | clus_blue_3_3_sk | i |

Feature 109 is similar to feature 107 except the skewness instead of the mean is computed. Feature 109 is used by the pre-stage 2 box filters.

| feature112 | clus_blur_7_7_sd | i |

Feature 112, a blur residue using a 7×7 structure element, is computed for a whole image. Feature 112 is the standard deviation of this feature. Feature 112 is used by the pre-stage 2 box filters.

| feature119 | image_sd | i |

Feature 119 is the standard deviation for the whole image. This is the standard deviation of the pixel values for every pixel in an image. This feature provides a measure of the amount of variation in pixel intensity across the entire 20× FOV. Feature 119 is used by one of the out-of-focus box filters, the cytoplasm box filters, and by stage 1 and stage 2 classifiers.

| feature120 | image_sk | i |
|---|---|---|

Feature 120 is the whole image skewness. This feature is the skewness of the values of every pixel in an image. It is a measure of how much pixel values are biased to one side or the other of mean pixel intensity. Skewness provides a measure of image content. Feature 120 is used by the stage 2 classifier.

| feature121 | image_ku | i |
|---|---|---|

Feature 121 is a whole image kurtosis. The feature is the 4th statistical moment or kurtosis taken on the whole image. Kurtosis provides a measure of the percentage of the population that is in the tails of the distribution. Feature 175 is used by the stage 2 classifier.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. In an automated system for analyzing a biological specimen having a thick group of cells, a thick group of cells classification apparatus comprising:

(a) an automated microscope having at least one image output;

(b) image segmentation means for identifying objects of interest connected to the image output, wherein the image segmentation means has a segmented image output;

(c) object feature calculation means for measuring properties of each segmented object having a segmented object output wherein the object feature calculation means has a thick group of cells object feature output; and (d) an object classification means for classifying thick group objects for analysis having an input connected to the thick group of cells object feature output, where the object classification means has a thick group of cells classification output, and where the object classification means comprises a multiple stage algorithmic classifier, wherein every stage is an algorithmic classifier and wherein at least one of the stages comprises a Fisher's binary decision tree classifier.

2. The apparatus of claim 1 wherein the biological specimen is a specimen prepared by the Papanicolaou method.

3. The apparatus of claim 1 wherein the biological specimen is a gynecological specimen.

4. The apparatus of claim 1 wherein the object classification means further comprises a digital computer.

5. An apparatus for training a system to recognize thick groups of interest comprising:

(a) means for acquiring at least one image from at least one biological specimen;

(b) means for detecting at least one thick group of cells for analysis from the at least one image, wherein the means for detecting has a thick group of cells output;

(c) means for obtaining diagnostic truth connected to the thick group of cells output, wherein the means for obtaining diagnostic truth has a truth established thick group of cells output;

(d) a means for computing features connected to the truth established thick group of cells output, wherein the means for computing features has a feature output;

(e) means for selecting features that best discriminate between thick groups of interest and other groups, wherein the means for selecting features has a discrimination output; and (f) classification means for separating thick groups of interest from other groups connected to the discrimination output, wherein the classification means has a classification output, where the object classification means comprises a multiple stage algorithmic classifier wherein every stage is an algorithmic classifier, and wherein at least one of the stages comprises a Fisher's binary decision tree classifier.

6. The apparatus for training a system to recognize thick groups of interest of claim 5 further comprising means for determining an overall gain for the classification means.

7. The apparatus of claim 5 wherein the thick group of interest comprises an abnormal group of cells.

8. The apparatus of claim 5 wherein the thick group of interest comprises an artifact.

9. The apparatus of claim 5 wherein the thick group of interest comprises a thick group of normal cells.

10. The apparatus of claim 5 wherein the biological specimen is a specimen prepared by the Papanicolaou method.

11. The apparatus of claim 5 wherein the biological specimen is a gynecological specimen.

12. The apparatus of claim 5 wherein the thick group detection means further comprises a digital computer.

13. In an automated system for analyzing a biological specimen having a thick group of cells, a thick group of cells classification process comprising the steps of:

(a) obtaining at least one image output;

(b) segmenting the at least one image output to identify objects of interest;

(c) measuring properties of each segmented object of interest to identify a plurality of object features indicative of a thick group of cells; and (d) processing the plurality of object features indicative of a thick group of cells to classify thick group objects for analysis by applying a multiple stage algorithmic classifier, wherein every stage is an algorithmic classifier and wherein at least one of the stages comprises a Fisher's binary decision tree classifier.

14. The process of claim 13 wherein the biological specimen is a specimen prepared by the Papanicolaou method.

15. The apparatus of claim 13 wherein the biological specimen is a gynecological specimen.

16. The apparatus of claim 13 wherein the object classification means further comprises a digital computer.

* * * * *